March 3, 1970  J. W. HOWARD  3,498,708
PHOTOCOPYING APPARATUS
Filed Sept. 9, 1965  2 Sheets-Sheet 1

INVENTOR.
JAMES W. HOWARD
BY
Byerly, Townsend, Watson & Churchill

ATTORNEYS

March 3, 1970　　　J. W. HOWARD　　　3,498,708
PHOTOCOPYING APPARATUS
Filed Sept. 9, 1965　　　2 Sheets-Sheet 2

INVENTOR.
JAMES W. HOWARD
BY
ATTORNEYS

United States Patent Office 3,498,708
Patented Mar. 3, 1970

3,498,708
PHOTOCOPYING APPARATUS
James W. Howard, Pompton Lakes, N.J., assignor to Inmont Corporation, New York, N.Y., a corporation of Ohio
Filed Sept. 9, 1965, Ser. No. 486,181
Int. Cl. G03b 15/00, 27/54
U.S. Cl. 355—3    10 Claims

ABSTRACT OF THE DISCLOSURE

In a photographic printer, compensation is made for the greater transmission of light along and near the optical axis by arranging the lighting source to illuminate the edge areas of the field to be illuminated with greater intensity than the area on and near the optical axis. This is done by concentrating the lamp tubes toward the outer areas of the field.

---

This invention relates to the production of photocopies of graphic originals and aims to provide compact apparatus whereby a sheet bearing an illuminated graphic original is scanned and an image of the scanned original is projected on the photosensitive face of a sheet of copy paper. It is a particular object of my invention to produce electrostatic copying apparatus that can be mounted on an ordinary desk and is adapted to copy, for general office use, a graphic original on a sheet having a photosensitive surface.

Electrostatic copying has been practiced in the past by conveying a sheet bearing a graphic original past a light source which consisted of high intensity tungsten filament lamps enclosed within the copying apparatus. As the sheet bearing the graphic original travels through such copying apparatus, it is scanned by an optical system that is adapted to project an image of the scanned original on the face of a sheet of copy paper having a light-sensitive surface, to create thereon a latent electrostatic charge image of the illuminated original. Most photoconductive coatings exhibit slow photo-response so it is essential that the high intensity tungsten filament lamps used to illuminate a graphic original be of high intensity. The radiant heat generated by such lamps often produces envelope temperatures which are so high that quartz, rather than glass, must be used for the envelope, and at the scanning rates that are employed in actual operation, such a lamp must be located an appreciable distance from the graphic original that it is designed to illuminate to avoid subjecting that original to the excessive heat that would cause it to be burned or otherwise damaged. The high temperatures that have been generated in electrostatic copying apparatus by high intensity tungsten filament lamps have also required the inclusion of provisions for forced ventilation of the apparatus while it is in operation. The resulting spatial requirements have rendered impossible the construction of electrostatic copying apparatus of the compactness that is sought in equipment designed for general office use.

The high intensity tungsten filament lamps have provided uniform illumination over the image area being scanned by the optical system of past copying apparatus but this has proved to be a further disadvantage as light is not transmitted uniformly through the optical system used in such apparatus. The light which is transmitted along the axis of the system is of greater intensity than that which is transmitted through its periphery so it has been necessary to interpose masks or shaped apertures in the copying apparatus between its object plane and its image plane to reduce the amount of light transmitted along that central axis if the illuminated image projected upon the image plane is to be of sufficient uniformity for the production of acceptable copies, thereby seriously impairing the efficiency of the copier.

I have discovered that it is possible to overcome the foregoing disadvantages which have inhered in past electrostatic copying apparatus through the use as the sole source of illumination of the graphic original of a specially shaped gaseous discharge fluorescent tube. That special tube is continuous, is of a generally rectangular configuration having straight sides joined by rounded corners and is of such size that it frames the object plane aperture. The side wall temperatures of that tube do not exceed 140° F. so it may be placed in close proximity to the object plane and it can then be made of such dimensions that the illumination supplied to the object plane thereby will be of a non-uniform intensity that will compensate for the non-uniform transmission of light through the optical system that is employed in projecting an image of the object upon an image plane. As a result, the illuminated image which is projected upon the image plane is sufficiently uniform for the production of acceptable copy without any necessity for resort to the masks or specially shaped apertures that were required in past electrostatic copying apparatus.

A further advantage realized through the use of my gaseous discharge fluorescent tube arises from the fact that several different types of phosphor can be used in the manufacture of such a lamp. This makes it possible to design a lamp whose spectral characteristics are such as to provide maximum emission at the wave lengths where the photoconductive coating has maximum sensitivity. This is important because in the formulation of photoconductive coatings it is frequently necessary to employ dyes to increase spectral sensitivity, and by proper selection of light source and dyes it is now possible to provide, with papers which are white, a system which is sensitive to the entire visible spectrum.

The apparatus that I employ for the production of photocopies of graphic originals in the practice of my invention includes a housing having a pair of entrance and exit openings for a sheet bearing a graphic original and a source for copy paper having a photosensitive surface. Means are provided for locating the graphic original in an object plane as it is copied and additional means locate the copy paper in an image plane as the graphic original occupies its object plane. Transports are included which simultaneously convey the graphic original and the copy paper across their respective object and image planes at related speed. A gaseous discharge fluorescent tube, which extends along the perimeter of a plane which is located in close proximity to the object plane and is parallel thereto, frames an area related in size and shape to the area of the graphic original being scanned and is adapted to illuminate that area on the graphic original. An optical system is provided which is adapted to project a uniform light image of the illuminated graphic original upon the photosensitive surface of the copy paper to form a latent image of the original thereon, and means are provided for shielding the photosensitive surface from extraneous light.

In order that my invention will be fully available to those skilled in the art, I will describe the specific embodiment thereof which I now prefer that is illustrated in the accompanying drawings in which.

The drawings illustrate an electrostatic copier of the type in which a sheet bearing a graphic original is fed manually into the copier where it is grasped by a transport that carries it past an aperture along an illuminated object plane; in synchronism therewith, a sheet of copy paper having an uncharged photoconductive surface is automatically withdrawn from a supply in a magazine therefor and grasped by a transport that carries it past an electrostatic charger and then along an image plane and through a developing tank; and an optical system scans the area of the graphic original that is illuminated as it travels past the object plane aperture and projects an image of that illuminated area in the charged photoconductive surface of the copy paper that travels along the image plane. More specifically, it includes a housing 10 having an inlet opening 11 at its front end for the insertion of a sheet bearing a graphic original so that it can be grasped by the transport therefor.

Figure 1:
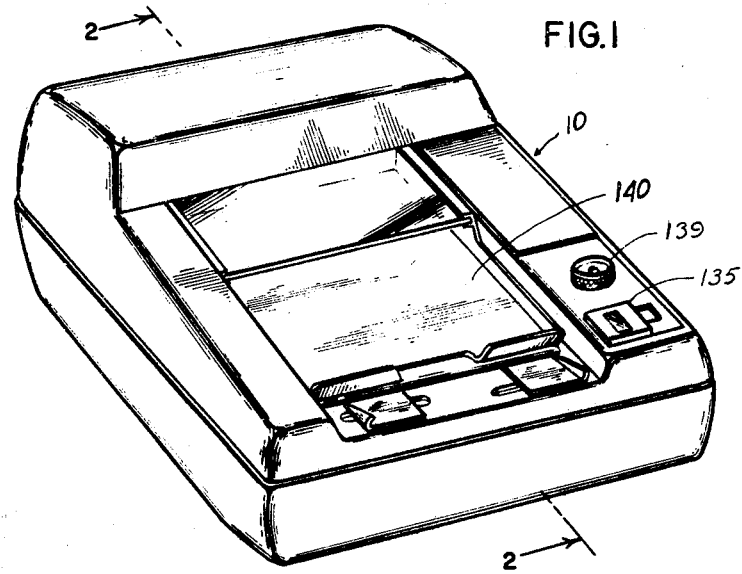
FIG. 1 is a lefthand perspective view of my new copier.
Figure 3:
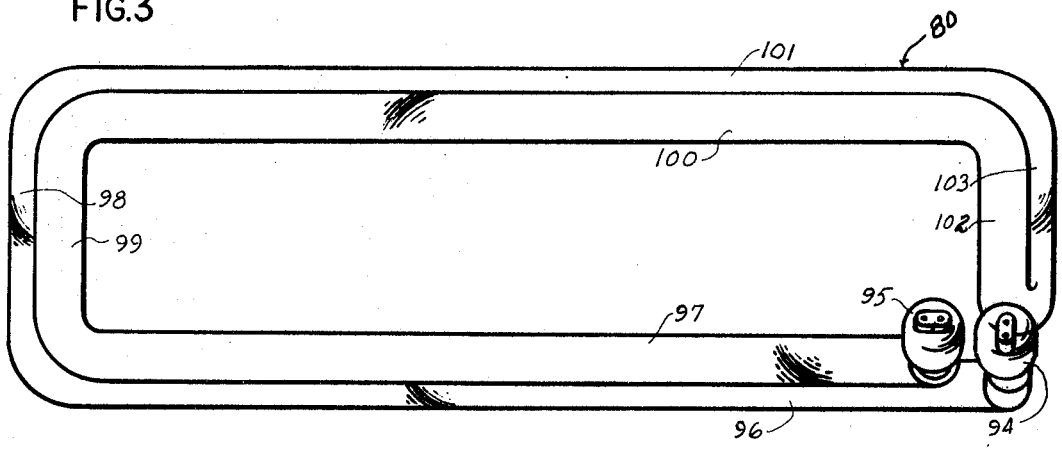
FIG. 3 is a rear elevation on a magnified scale of the lamp illustrated in FIG. 2.
Figure 4:
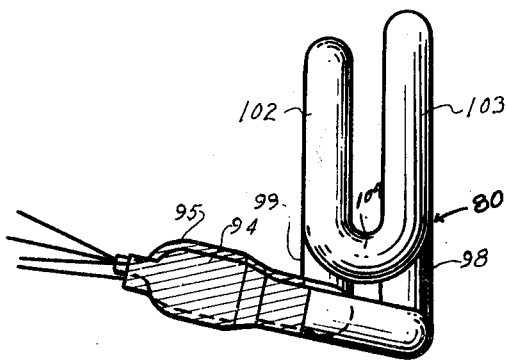
FIGS. 4 and 5 are, respectively, an end elevation and a plan view of the lamp illustrated in FIG. 3.
Figure 2:
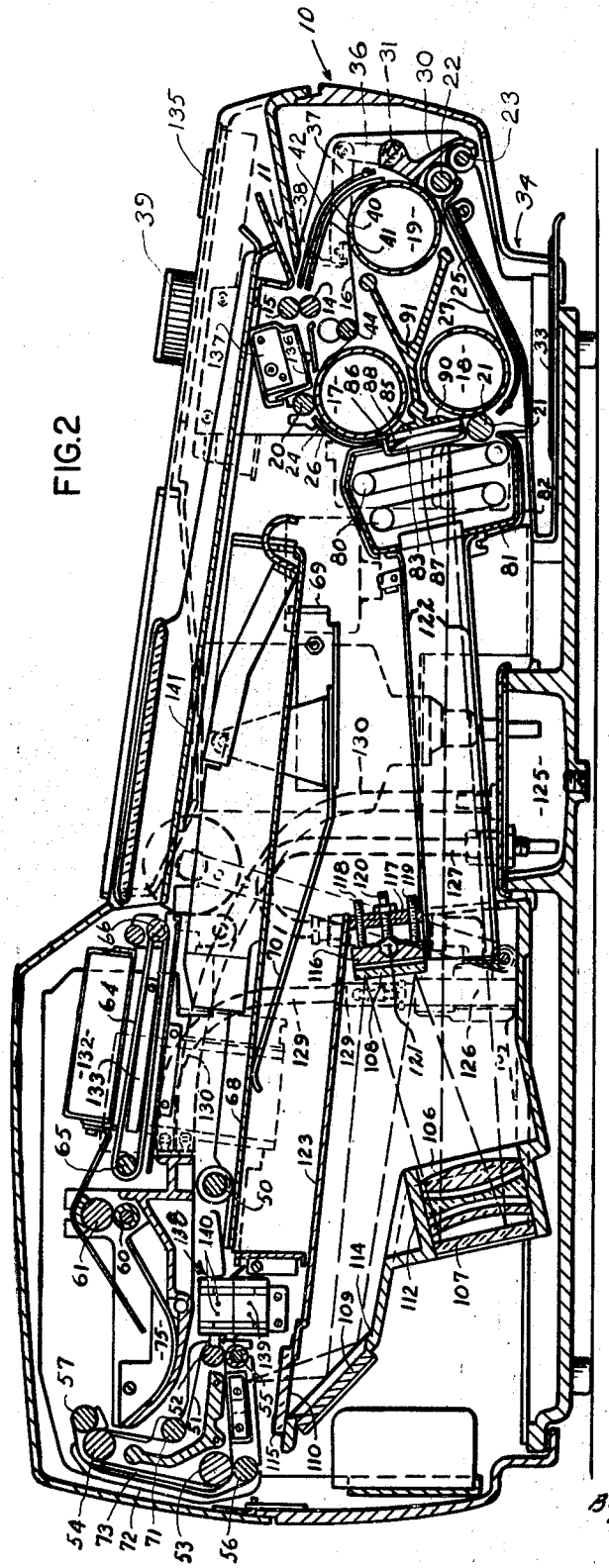
FIG. 2 is a section upon an enlarged scale along lines 2—2 of FIG. 1 illustrating schematically the apparatus used in the practice of my invention.
Figure 5:
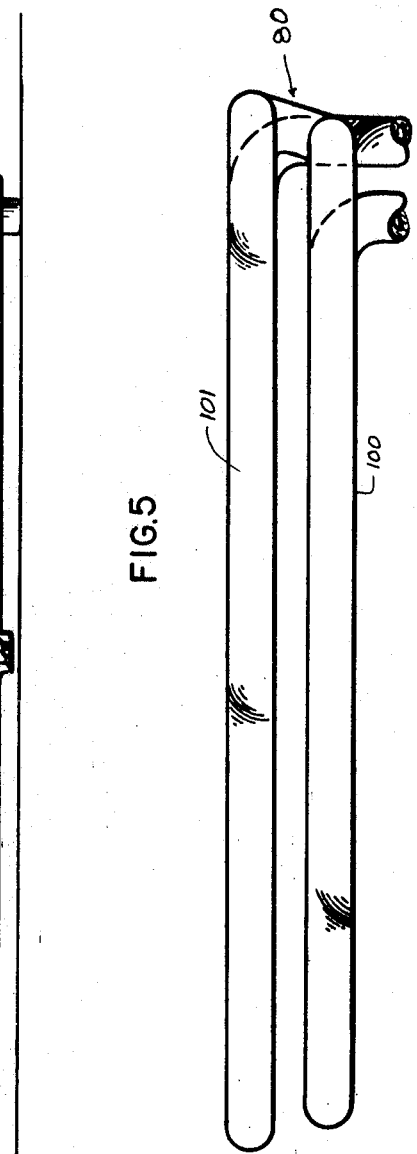

The transport for the sheet bearing the graphic original is mounted in the front end of the housing 10. It includes a driven roller 14 and an idler roller 15 that is rotated thereby; an endless belt 16 that travels around a set of driven rollers 17, 18, 19 which are associated, respectively, with idler rollers 20, 21, 22; and an idler roller 23 which is rotated by the roller 22. A pair of guide plates 24 and 25 define channels 26 and 27 through which the sheet passes from the nip of rollers 14 and 15 to the nip of rollers 19 and 22. A deflector 30 mounted for rocking movement about shaft 31 will, in the position which it occupies as illustrated in FIG. 2, direct a sheet emerging from the nip of rollers 19 and 22 to the nip of rollers 22 and 23, whence it passes to the tray 33. An opening 34 at the lower front end of housing 10 permits the operator to remove the sheet bearing the graphic original from the tray 33. An arm 36 which is fixed to shaft 31 is connected through link 37 with movable lever 38, which is controlled by knob 39, for the purpose of rocking that shaft. When the shaft 31 is rocked in a counterclockwise direction from the position illustrated in FIG. 2, deflector 30 guides the sheet bearing the graphic original to the channel 40 between plates 41 and 42 so that its leading edge again enters the nip between rollers 14 and 15 when another copy of that graphic original is desired. The endless belt 16 is maintained under proper tension by means of roller 44.

The transport for the copy paper is mounted in the upper rear end of housing 10. It includes a driven roller 50; an endless belt 51 that travels around a set of driven rollers 52, 53 and 54 which are associated respectively, with idler rollers 55, 56 and 57; a driven roller 60 which rotates an idler roller 61; and a series of O-rings 64 which are rotated around driven roller 65 and idler roller 66. A tray 68 that is mounted for pivotal movement about tab 69 provides a magazine for a supply of copy paper and is urged against driven roller 50 by leaf spring 70. Driven roller 50 feeds the uppermost sheet of copy paper in the magazine into the nip between idler roller 55 and endless belt 51. The endless belt 51 is maintained under proper tension by roller 71. A guide belt 72 provides a channel 73 through which the sheet of copy paper travels with endless belt 51 until it reaches the nip between the rollers 54 and 57 which deliver the sheet of copy paper to developing tank 75.

Illumination of the graphic original whose image is projected upon the light-sensitive surface of the copy paper is provided by a single lamp indicated generally at 80. A reflector 81 which surrounds the lamp 80 is mounted in a casing 82 which is provided, in its front face, with an opening 83 which constitutes the object plane aperture. A plate 85 of transparent glass having a beveled upper edge 86 is mounted for sliding movement in a bracket 87 that projects through the object plane aperture 83. Mounted in the bracket 87 at each of its ends is a spring 88 which presses the glass plate 85 toward the face 90 of casting 91. The outer face of that glass plate 85 coincides with the object plane and it is a particular feature of my invention that lamp 80 is mounted in close proximity thereto.

The lamp 80 is a gaseous discharge fluorescent device of the hot cathode type. It is formed from a continuous glass tube bent to a generally rectangular configuration that is related in both size and shape to object plane aperture 83. The terminals 94, 995 project rearwardly from the ends of the glass tube forming lamp 80 at one side of the rectangle formed thereby. The glass tube forming lamp 80 has two lengths 96, 97 extending in a horizontal direction from the ends bearing terminals 94, 95 to a pair of vertical legs 98, 99. A second pair of horizontal lengths 100, 101 join legs 98, 99 to a second pair of vertical legs 102, 103 that are joined to each other through the bend 104.

The optical system which projects an illuminated image of the portion of the graphic original located in front of object aperture 83 upon the photoconductive surface of the copy paper in the image plane includes: lens 106 and mirrors 107, 108 and 109. A transparent glass plate 110 is mounted above mirror 109 as a protective measure. The construction of the optical system contributes to the compactness of the copier since it permits projection upon a generally horizontal image plane of the illuminated image of a graphic original traveling along a generally vertical object plane.

The mirror 107 and its associated lens 106 are mounted in a fixed holder 112. The mirror 109 is also mounted in a fixed holder 114. These holders 112, 114, in the construction illustrated in FIG. 2, constitute part of the housing for the complete optical system. However, mirror 108 is mounted on a universally adjustable support 116. The support 116 is connected to the transverse frame member 117 through pairs of set screws 118, 119 and a longitudinally adjustable bolt 120 to which the support 116 is attached by means of universal joint 121. The optical system is shielded from extraneous light entering apertures in housing 10 by means of the duct 122 and transverse plate 123.

The developing tank 75 is provided with liquid toner from a reservoir 125 by means of pump 126. Tube 127, which communicates with the interior of reservoir 125, leads to pump 126 and toner is delivered thereby through tube 129 to developing tank 75. The toner is kept under constant circulation and, to permit this, overflow from developing tank 75 is returned to reservoir 125 through tube 130. Drying ducts 132, 133 are provided to volatilize the liquid component of the toner that is used in the practice of my invention, which component is of volatile character.

In electrostatic copiers of the type with which my invention is concerned, it is conventional practice to drive the transports for the graphic original and the copy paper by means of an electric motor, and conventional electric circuits are utilized to control such motors and the driving means associated therewith to turn on the lamp and dryer, and such blowers as may be deemed advisable, and the like, at appropriate times. Such a motor and driving means are utilized in the operation of the apparatus that I have invented but, as they are used in conjunction with known controls, the motor, associated driving mechanism and electric circuit employed have not been described or illustrated as this is deemed to be unnecessary to enable those skilled in the art to practice my invention.

The operation of the apparatus which I have described is as follows: A pile of sheets of copy paper, each having a photosensitive lower surface, is placed on tray 68 and the main switch 135 is turned on. A sheet bearing on its upper surface the graphic original to be copied is then thrust into the opening 11 in housing 10 until its leading edge enters the nip between driven roller 14 and idler roller 15. These deliver the sheet to the nip between the endless belt 16 and the driven roller 20. Located in the path of the sheet between those nips is the finger 136 of microswitch 137. This finger 136 is tripped by the sheet bearing the graphic original to close the circuit (not shown) controlled by microswitch 137, and which includes the means, indicated generally at 138, for impressing an electrostatic charge on the photosensitive copy paper and actuation of the driven roller 50 that pushes the uppermost sheet of that copy paper from tray 68.

The timing of the operation of the transports for the sheet bearing the graphic original to be copied and the copy paper is such that as the leading edge of the graphic original sheet enters the object aperture, the leading edge of the sheet of copy paper enters the image aperture. The sheet of copy paper on its way from tray 68 to the nip between idler roller 55 and endless belt 51 passes between pairs of transverse corona discharge wires 139, 140 that impress a blanket electrostatic charge upon the photosensitive surface of the copy paper in conventional manner. The optical system scans the illuminated area of the graphic original to be copied as the sheet bearing it travels through the object aperture and projects a uniformly illuminated image thereof upon the photosensitive surface of the copy paper as that paper travels at related speed along the image plane, thereby forming thereon a latent electrostatic charge image of the illuminated area of the graphic original that then occupies the object aperture.

After the sheet bearing the graphic original and the sheet of copy paper bearing the latent electrostatic charge image of that graphic original have passed through their respective object and image apertures, the copy paper is delivered to tank 75 where it is developed in conventional fashion by the liquid toner contained therein. It is then drawn from tank 75 by driven roller 60 and idler roller 61 to the series of O-rings 64 which carry the sheet through drying ducts 132, 133 and then deposit it in receiving tray 141. At the same time, the sheet bearing the graphic original to be copied is either delivered to tray 33 or is returned to its transport for the preparation of another copy, depending upon the position occupied by deflector 30 as described above.

The terms that I have used in describing the preferred embodiment of my invention that is illustrated in the accompanying drawings are terms of description and not of limitation, and it is to be understood that the apparatus that I have described may be modified in various ways without departing from the spirit of my invention as it is defined in the appended claims.

What I claim is:

1. Apparatus for producing photocopies of graphic originals, comprising:
   a housing having a pair of entrance and exit openings for a sheet bearing a graphic original and means to supply copy paper having a photosensitive surface;
   means locating an object plane occupied by the graphic original as it is copied in said apparatus;
   means locating an image plane occupied by said copy paper as the graphic original occupies said object plane;
   means for simultaneously conveying said graphic original and said copy paper across the object plane and the image plane respectively at related speed;
   a gaseous discharge fluorescent tube, extending along the perimeter of a plane located in close proximity to said object plane, and parallel thereto, to frame an area related in size and shape to the area of the graphic original being scanned, and adapted to illuminate said area on the graphic original with light of non-uniform intensity that is brightest along the edges and least bright at the center of said area;
   an opical system adapted to transmit light whose intensity varies inversely with the brightness of the illumination supplied to said area on the graphic original by said gaseous discharge fluorescent tube and project a uniform light image of said illuminated area upon the photosensitive surface of the copy paper in said image plane so that a latent image of said illuminated area is formed thereon; and
   means for shielding said photosensitive surface from extraneous light.

2. Apparatus according to claim 1 wherein said gaseous discharge fluorescent tube is formed from a continuous glass envelope having two pairs of horizontal lengths and two pairs of vertical legs connected therewith.

3. Apparatus according to claim 2 wherein one of the pairs of horizontal lengths and vertical legs frames a first rectangular and the second pair of horizontal lengths and vertical legs frames a second rectangle that is smaller than said first rectangle.

4. Apparatus according to claim 1 wherein said object plane is substantially vertical and said image plane is substantially horizontal.

5. Apparatus according to claim 1 wherein said optical system includes a pair of fixed mirrors, a third mirror adapted to reflect an image from one of said pair to the face of the other of said pair of mirrors; and a universally adjustable mounting for said third mirror.

6. Electrostatic copying apparatus comprising the combination, in a housing therefor, of:
   charging means adapted to give an electrostatic charge to an uncharged photoconductive surface;
   means locating an object plane occupied by original graphic subject matter as it is copied in said apparatus;
   a gaseous discharge fluorescent tube, extending along the perimeter of plane located in close proximity to said object plane, and parallel thereto, framing an area related in size and shape to the area of the graphic original being scanned, and adapted to illuminate said area on the graphic original with light of non-uniform intensity that is brightest along the edges and least bright at the center of said area;
   an optical system adapted to transmit light whose intensity varies inversely with the brightness of the illumination supplied to said area on the graphic original by said gaseous discharge fluorescent tube and project a uniform light image of said illuminated area upon said photoconductive surface so that a latent electrostatic charge image of said illuminated area is formed thereon; and
   means for shielding said photoconductive surface from extraneous light.

7. Electrostatic copying apparatus according to claim 6 wherein said charging means includes transverse corona discharge wires.

8. Electrostatic copying apparatus according to claim 6 including a developing tank and means for continuously circulating liquid toner through said tank.

9. Electrostatic copying apparatus according to claim 8 including a receiving tray for developed copy paper and a drying duct located between the developing tank and said tray.

10. Electrostatic copying apparatus according to claim 6 including:
    means for supplying sheets of copy paper having a photosensitive surface;
    means locating an image plane; and
    a transport adapted to convey successive sheets of copy paper from said supply along said image plane, wherein said charging means is located along the path of said copy paper from said copy paper supply to said image plane.

(References on following page)

References Cited

UNITED STATES PATENTS

| | | |
|---|---|---|
| 2,327,818 | 8/1943 | Peterson. |
| 2,490,370 | 12/1949 | Neuwirth. |
| 2,923,812 | 2/1960 | Hauptvogel. |
| 3,272,100 | 9/1966 | Teutsch _____ 95—1 |

FOREIGN PATENTS 833,489  7/1938  France.

JOHN M. HORAN, Primary Examiner

U.S. Cl. X.R.

355—51, 70